United States Patent [19]

Pierret

[11] 3,934,179

[45] Jan. 20, 1976

[54] TANTALUM ANODE FOR ELECTROLYTIC DEVICES

[75] Inventor: James A. Pierret, Muskogee, Okla.

[73] Assignee: Fansteel Inc., North Chicago, Ill.

[22] Filed: Mar. 5, 1975

[21] Appl. No.: 555,377

Related U.S. Application Data

[60] Continuation of Ser. No. 290,624, Sept. 20, 1972, which is a division of Ser. No. 132,075, April 7, 1971, abandoned, which is a continuation of Ser. No. 756,357, Aug. 30, 1968, abandoned, which is a division of Ser. No. 701,870, Jan. 31, 1968, Pat. No. 3,418,106, which is a continuation-in-part of Ser. No. 369,039, May 17, 1967, abandoned.

[52] U.S. Cl..................... 317/230; 29/182; 75/.5 R; 75/200; 204/292
[51] Int. Cl.²......................................... H01G 9/00
[58] Field of Search ........ 317/230; 29/182; 75/.5 R, 75/200; 204/292

[56] References Cited
UNITED STATES PATENTS

| 3,144,328 | 8/1964 | Doty | 75/209 |
|---|---|---|---|
| 3,422,515 | 1/1969 | Klein | 317/230 |
| 3,667,002 | 5/1972 | Klein | 317/230 |
| 3,688,161 | 8/1972 | Klein | 317/230 |
| 3,742,369 | 6/1973 | Douglass | 317/230 |

*Primary Examiner*—Andrew J. James
*Attorney, Agent, or Firm*—Dressler, Goldsmith, Clement & Gordon, Ltd.

[57] ABSTRACT

An anode for electrolytic devices formed from pressed and sintered compacts of an agglomerated refractory metal powder comprised of polynodal granules of adhered particles with the nodes being of a size the same order of magnitude as the size of the individual particles. Such agglomerated powder is produced by the method including the steps of heating a powder under chemically non-reactive conditions to effect agglomeration between the powder particles, and subsequently crushing the resultant particulate porous agglomerated mass to form said agglomerated polynodal granules. The anodes combine low green and sintered density, equivalent series resistance, dissipation factor and D.C. leakage with a high specific capacitance.

16 Claims, No Drawings

3,934,179

TANTALUM ANODE FOR ELECTROLYTIC DEVICES

BACKGROUND OF INVENTION

This is a continuation of co-pending application Ser. No. 290,624, filed Sept. 20, 1972, which was a division of co-pending application Ser. No. 132,075, filed Apr. 7, 1971, now abandoned, which was a continuation of co-pending application Ser. No. 756,357, filed Aug. 30, 1968, now abandoned, which was a division of co-pending application Ser. No. 701,870, filed Jan. 31, 1968, now U.S. Pat. No. 3,418,106, which was a continuation-in-part of co-pending application Ser. No. 369,039, filed May 17, 1967, now abandoned.

The use of refractory metals, such as, for example, tantalum, has become increasingly widespread in recent years due to the well known characteristics of such metals. One of these characteristics, the high melting point, makes it difficult to process such materials in conventional manners and has resulted in the development of powder metallurgy technology to fully utilize such materials. Typically, in powder metallurgy, metal powders are pressed into basic shapes, sintered to form a compact and then, if necessary, worked into a desired final shape.

One desirable characteristic of such powder metal products is that the sintered compacts are often porous, a characteristic useful, for example, for infiltration of other materials into the compact. Often, however, the pressures required to obtain sintered compacts result in products having a greater density than might be desired.

For example, one common use of tantalum powder is for the formation of electrodes for use in electrolytic capacitors. These components are made, as is well known in the art, by pressing the tantalum powder to form a coherent compact, sintering this compact and subsequently forming a dielectric film on the sintered compact. Such electrodes are advantageous since, being porous, they have a surface area considerably larger than the area of the outside surface of the electrode itself.

Accordingly, when such sintered tantalum compacts are used as anodes in electrolytic capacitors they provide a large reactive surface area in a relatively small volume. This is important since the capacitance of a capacitor is directly related to the surface area of its electrodes.

Problems are encountered, however, in obtaining desired density and porosity of powder metal compacts. For example, in tantalum anodes, high purity of the metal is a factor in minimizing current leakage across the dielectric film formed on the anode. High purity is obtained by utilizing high sintering temperatures to volatilize various detrimental impurities present in the powder. In the formation of tantalum anodes, for example, temperatures of at least 1700°C and usually 1800°C or more are used in order to provide a high purity compact.

This high sintering temperature results in a sintered compact of increased density and lower surface area, thereby providing an anode of lower capacity, as compared with those compacts prepared at lower sintering temperatures. Since low current leakage is almost a necessity for high voltage application, and since the capacity of an anode further decreases as formation voltage increases, such sintered tantalum powder electrodes are not completely satisfactory for use in high voltage application where relatively high capacitance, low dissipation and low leakage are desired.

SUMMARY OF INVENTION

In accordance with the present invention there is provided an agglomerated refractory metal powder, such as tantalum powder, which is capable of being pressed and sintered to form compacts of reduced density, higher surface area and more uniform porosity than previously existing sintered compacts. When such compacts are utilized as anodes, e.g., in tantalum electrolytic capacitors, they possess increased capacity, have a lower dissipation factor and have current leakage levels as low as existing tantalum anodes or lower.

Furthermore, when using the powder of the present invention, sintered compacts can be advantageously prepared by pressing the powder at lower pressures since the agglomerated powder tends to shift less than nonagglomerated powders and possesses better flow characteristics than existing high capacity tantalum powders.

Powders of this invention are prepared by heating metal powder, such as tantalum, the agglomeration under chemically non-reactive conditions. Agglomeration of such powders should be understood to include the heating of the powder at temperatures sufficient to allow the individual powder particles to begin to physically adhere one to the other but not sufficient to allow the individual identity of the particles to be lost, such as occurs when such powders are sintered.

The resulting particulate porous mass is crushed to form agglomerated polynodal powder granules of adhered particles having a greater bulk volume and lower bulk density than unagglomerated powder of the same particle size as the powder from which the agglomerated powder is formed, and in which the nodes of the granules are of a size the same order of magnitude as the size of the particles from which the agglomerated powder is formed.

As indicated above, the particulate porous mass is formed by heating the metal powder, such as tantalum, to agglomeration under chemically non-reactive conditions. It should be noted that this particulate porous mass is a mass of agglomerated tantalum metal powder. This particulate porous tantalum mass is directly crushable as tantalum to form the agglomerated polynodal powder granules of the present invention without the necessity of using any supplemental chemical or metallurgical treatment, e.g., without subjecting the particulate porous mass to a hydriding process. Not only is the particulate porous mass so crushable, but the agglomerated polynodal powder granules of adhered particles of tantalum metal are also crushable under the same conditions.

One suitable tantalum powder which can be processed in accordance with the present invention is prepared by crushing and separating into desired particle size a tantalum ingot, typically formed by electron beam melting procedures, as is well known in the art. The powder produced in this way from such electron beam melted ingots generally comprises crystalline granules of cubic habit.

Another type of powder which can be prepared in accordance with the present invention is a powder made from reducing a salt of tantalum, such as potassium fluorotantalate ($K_2TaF_7$), with an alkali metal, such as sodium, typically at temperatures above the melting point of all ingredients and products except tantalum which precipitates as a fine dendritic powder.

Typically, this sodium reduced powder is formed into tantalum electrodes having higher capacity and larger current leakage than sintered electrodes prepared from the electron beam melted material. For this reason, such sodium powders are not as suitable for use in high voltage applications as are electron beam powder products.

In the formation of agglomerated powder for use in capacitor anodes, tantalum powder particles, typically ranging in size between about 2 and 30 microns are heated at temperatures of about 1200°–1550°C to form a particulate porous agglomerated mass. The mass is crushed to form polynodal granules having a size from 50–100 weight per cent smaller than 325 mesh in which the nodes of the granules range in size between about 2 and about 30 microns. The bulk density of such agglomerated powder ranges between about 65–75 grams per cubic inch in comparison with unagglomerated powder which has a bulk density of about 80–85 grams per cubic inch.

The optimum reaction temperature depends in part upon the particle size distribution of the tantalum powder used. A tantalum powder with most if its particles being less than ten microns is agglomerated at a temperature in the vicinity of 1200°–1300°C in order to avoid excessive fusion of the tantalum particles into a unitary mass. Contrariwise, when a tantalum powder consists essentially of particles of a size greater than 20 microns, the agglomerating temperature is likely to be higher, or the time of agglomeration longer.

The agglomeration process is generally performed under an inert atmosphere such as argon or helium, or in a vacuum, typically of one micron of mercury or less.

The measurement of the size and distribution of powder particles is conventional. The powder particles can be sorted, if desired, by an instrument, such as a Roller Separator, and the measurement taken microscopically.

In the formation of tantalum powder for use as electrodes, it is desirable to continue crushing the particulate mass until from 75–90 weight percent of the resulting powder passes through a 325 mesh screen (U.S. standard screen scale). It is generally desirable to discontinue the crushing action when about 95 weight percent of the powder product passes through a 325 mesh screen, as excessive crushing can cause the unique characteristics of the powder of this invention to diminish. Powders in which less than 50 percent of their weight pass through a 325 mesh screen tend to form structurally weak, sintered electrodes of lower electrical capacity. Empirically, it has been found that agglomerated tantalum powder which has been crushed to pass completely through a 60 mesh screen has a size distribution which closely resembles the size distribution of a tantalum powder which has been crushed until 90 per cent of the powder passes through a 325 mesh screen, and the two powders form sintered electrodes having roughly similar characteristics.

It is desirable to use only a simple crushing action during the crushing step rather than using a more severe milling action in order to preserve the agglomerated condition of the powder. A smooth-jaw jaw crusher is highly suitable for this use.

The sintering temperature ranges between about 1700°C and about 2100°C in order to purify the tantalum by volatilizing the harmful contaminates in the electrode, as is known in the art. The sintering step is typically performed in a vacuum. The powdered tantalum may be initially held together after pressing and before sintering by the addition of a small amount, e.g., two weight percent, of a binding agent for the compressed powder. Waxes are suitable binding agents, particularly polyethyleneglycol wax.

The following examples are for illustrative purposes only and should not be construed to limit the invention, which is described in the appended claims.

Quantitative measurements of the capacitance of the composite tantalum powder electrodes described in this application are expressed in terms of specific capacity (CV/g), which is the capacitance of the electrode in microfarads, multiplied by the anodizing of forming voltage used for placing an anodized film on the given electrode, and divided by the weight of the electrode in grams.

EXAMPLE 1 a. A tantalum powder prepared by crushing an electron beam melted tantalum ingot into particles having a size ranging essentially from 2–30 microns was heated in a vacuum at 1350°C for 1 hour. The resulting agglomerated mass was then crushed to a powder in a smooth-jaw jaw crusher until 75 weight percent of the product was less than 325 mesh.

b. A two-gram portion of the agglomerated powdered product was mixed with two weight percent of a polyethyleneglycol wax binder (e.g., Carbowax 6000, sold by the Union Carbide Company) and pressed in a quarter inch cylinder at about 40 pounds pressure to form a compact of about 62 mm. in length.

c. A two-gram portion of the original, unagglomerated tantalum powder was mixed with about two weight percent of the same polyethyleneglycol wax and similarly pressed into a compact having same dimensions as the above. In this case, about 80 pounds of pressure were required in order to obtain a coherent compact.

d. The two compacts were sintered in a vacuum at 1900°C for 10 minutes, cooled and measured for their electrical capacity as follows: The sintered compacts were formed to 200 volts in a 0.01 percent solution of phosphoric acid at 90°C, holding a constant current of 70 milliamps until desired potential was achieved.

e. The formed compacts were then dried, and their capacitance checked in a ten weight percent aqueous solution of phosphoric acid with a General Radio Company capacitance bridge.

The specific capacity (CV/g) of the formed compacts was then calculated, being the capacitance in microfarads multiplied by the forming voltage (200 volts in this case) and divided by the weight of the compact (two grams).

The compact of (b) above, made from the agglomerated powder, exhibited CV/g of 3600, while the compact of (c) above exhibited a CV/g of 3360.

EXAMPLE 2

Tantalum compacts, otherwise identical to those of Example 1, were sintered in a vacuum at 1900°C for 50 minutes. The CV/g, obtained as shown above, of the sintered compacts made from the agglomerated powder was 2800, while the CV/g of the sintered compact made from the unagglomerated powder was 2350.

EXAMPLE 3 a. An unagglomerated tantalum powder, prepared as in Example 1, and having a range of particle sizes of 90 weight percent of the powder greater than five microns and 96 weight percent of the powder less than twenty microns, was agglomerated in a helium atmosphere for 1 hour at 1440°C.

b. This particulate mass was then crushed in a smooth-jaw jaw crusher until 84 weight percent of the product was less than 325 mesh.

c. Two-gram portions, each of the above agglomerated and unagglomerated powders, were fabricated into quarter-inch compacts by the methods described in paragraphs (b) and (c) of Example 1. The green density of the compact (the density before sintering) made from agglomerated powder was about 8.0, while the density of the rod made from unagglomerated powder was about 8.5.

d. The green compacts were sintered in a vacuum at 2000°C for 30 minutes, after which the densities of the sintered compacts made from the agglomerated and unagglomerated powders were, respectively, 9.2 and 10.5.

e. The sintered compacts were then anodized and tested in the manner of Example 1.

The compacts prepared from the agglomerated powder exhibited a CV/g of 2850 and had a dissipation factor of 10.2 percent, while the compact prepared from the unagglomerated powder exhibited a CV/g of 2250 and had a dissipation factor of 15.3 percent.

Both compacts had a direct current leakage at full charge of about 2 microamps, tested in a 0.01 percent solution of phosphoric acid at 140 volts.

EXAMPLE 4 a. An unagglomerated tantalum powder, prepared as in Example 1, had a range of particle sizes of 90 weight percent of the powder greater than 5 microns and 96 weight percent of the powder less than 20 microns, was agglomerated in a helium atmosphere for 1 hour at 1440°C.

b. This particulate mass was then crushed in a smooth-jaw jaw crusher until 84 weight percent of the product was less than 325 mesh.

c. Two-gram portions, each of the above agglomerated and unagglomerated powders, were fabricated into quarter-inch compacts by the methods described in paragraphs (b) and (c) of Example 1.

d. Both green compacts were sintered in a vacuum at 1800°C for 30 minutes. The sintered density of the compact formed from the agglomerated powder was 9.2, while the compact formed from the unagglomerated powder had a sintered density of 11.5.

e. They were then anodized and tested in the manner of Example 1.

The compact prepared from the agglomerated powder had a CV/g of 4100 and a dissipation factor of 14 percent, while the compact prepared from the unagglomerated powder had a CV/g of 3600 and a dissipation factor of 30 percent.

Both compacts had a direct current leakage at full charge of about 1.5 microamps, tested in a 0.01 percent solution of phosphoric acid at 140 volts.

EXAMPLE 5 a. An unagglomerated tantalum powder prepared by the reduction of potassium fluorotantalate with sodium, and having a range of particle sizes of 80 weight percent of the powder greater than five microns and 98 weight percent of the powder less than twenty microns, was agglomerated in a helium atmosphere for one hour at 1250°C.

b. The resulting product was then crushed in a smooth-jaw jaw crusher until about 70 weight per cent of the product was less than 325 mesh.

c. Two-gram portions, each of the above agglomerated and unagglomerated powders, were fabricated into quarter-inch compacts by the methods described in Example 1.

d. Both compacts were sintered in a vacuum at 2000°C for 30 minutes.

e. They were then anodized and tested in a manner similar to that of Example 1.

The CV/g of the (compact) prepared from the agglomerated powder was 4500 and its dissipation factor was 24 percent, while the CV/g of the (compact) prepared from the unagglomerated powder was 4200, and its dissipation factor was 30 percent.

Both compacts had a direct current leakage at full charge of about 0.6 microamps, tested in a 0.01 percent solution of phosphoric acid at 140 volts.

EXAMPLE 6 a. A tantalum powder prepared by crushing an electron beam melted tantalum ingot into a powder having a range of particle sizes such that 97 percent of the powder was less than 20 microns and 94 percent greater than 3 microns. This powder was heated in a vacuum of less than 0.1 micron of Hg at a temperature of about 1400° to 1425°C for 1 hour. The resulting agglomerated mass was then crushed to a powder in a smooth-jaw jaw crusher until the entire product was less than 60 mesh.

b. Two-gram portions of both the agglomerated powder and the original unagglomerated powder were each pressed in a quarter-inch diameter cylinder with about 675 pounds applied to a quarter-inch pressing punch to form a compacted mass.

c. The compacts were sintered in a vacuum of less than 0.1 micron of Hg at a temperature of 2000°C for 30 minutes. The sintered compacts were formed to 200 volts and measured for their CV/g in the manner shown by Example 1, and measured for direct current leakage at full charge in a 0.01 percent solution of phosphoric acid at 140 volts.

Five different runs of tantalum powder having the above stated particle size distribution were processed and tested in the manner described above. The result of the testing was as follows:

| ORIGINAL, UNAGGLOMERATED TANTALUM POWDER | | AGGLOMERATED TANTALUM POWDER |
|---|---|---|
| Run Number | CV/gm | CV/gm |
| 1 | 2407 | 2937 |
| 2 | 2387 | 2900 |
| 3 | 2387 | 3035 |
| 4 | 2432 | 3035 |
| 5 | 2432 | 3180 |

The densities (in grams per c.c.) of the two compacts of run number 1 above were measured both before and after sintering. The density of the compact made from unagglomerated tantalum powder was 8.9 before sintering and 11.6 after sintering, while the density of the compact made from agglomerated tantalum powder was 7.0 before sintering and 9.2 after sintering.

The compacts of the other runs of this example exhibit similar densities.

EXAMPLE 7

Tantalum powder was compacted and sintered at a temperature of about 2200° to 2400°C until a unitary mass was formed. The sintered product was cooled, and then reheated at 600°C in a hydrogen atmosphere. The product was again cooled and then milled to form a powdered product having a size distribution such that 95 percent of the powder was of particle size greater than 3 microns and 98 percent was of particle size less than 25 microns. This powdered product was then agglomerated at 1400° to 1425°C for 1 hour in a vacuum of less than 0.1 micron of Hg, and was cooled and crushed in a smooth-jaw jaw crusher until all of the powder was less than 60 mesh.

The powder was then pressed into compacts, sintered, formed (anodized), and tested in the manner of Example 6.

The sintered, unagglomerated powder was also prepared for testing and tested in a similar manner. The results were:

|  | Original Unagglomerated Tantalum Powder | Agglomerated Tantalum Powder |
| --- | --- | --- |
| Density (g/cc) Sintered | 9.08 | 7.97 |
| Density | 12.44 | 10.16 |
| CV/g | 2187 | 2887 |
| Dissipation Factor % | 36 | 18 |

It will be readily observed from the foregoing detailed description of the invention and in the illustrated embodiments thereof that numerous variations and modifications may be effected without departing from the true spirit and scope of the novel concepts and principles of this invention.

What is claimed is:

1. A pressed and sintered compact for use as a tantalum anode in electrolytic devices formed from a pressed compact of agglomerated tantalum ingot-hydride powder having a green density no greater than about 8 g./c. and sintered at a temperature of about 2,000°C for a period of about 30 minutes, said pressed and sintered anode exhibiting a specific capacity of at least 2,700 microfarad-volts per gram when formed to 200 volts in a 0.01 percent solution of phosphoric acid at 90°C at a constant current of 35 ma. per gram and when tested at full charge at 140 volts in a 0.01 percent solution of phosphoric acid.

2. A pressed and sintered compact for use as a tantalum anode as claimed in claim 1 having a sintered density of no more than about 9.2 g./c.c.

3. A pressed and sintered compact for use as a tantalum anode as claimed in claim 1 wherein the particles forming the agglomerated powder range in size between about 2 and about 30 microns.

4. A pressed and sintered compact for use as a tantalum anode as claimed in claim 1 having a dissipation factor of no more than about 18%.

5. A pressed and sintered compact for use as a tantalum anode in a electrolytic device formed from a pressed compact of agglomerated tantalum powder produced from sodium reduced tantalum and having a green density of no more than about 8 g./c.c. and sintered at a temperature of about 2,000°C for a period of about 30 minutes, said pressed and sintered anode having a dissipation factor of no more than about 26% and a direct current leakage of no more than about 0.6 microamps per gram when formed in 200 volts in a 0.01 percent solution of phosphoric acid at 90°C at a constant current of 35 ma. per gram and tested at full charge at 140 volts in a 0.01 per cent solution of phosphoric acid.

6. In a tantalum electrolytic device of the type having an electrolyte, and an anode formed from a pressed compact of agglomerated tantalum ingot-hydride powder, sintered at a temperature of about 2,000°C for a period of about 30 minutes, and formed at 200 volts in a 0.01 percent solution of phosphoric acid at 90°C at a constant current of 35 ma. per gram, said electrolytic device having a specific capacity of at least 2,700 microfarad/volts per gram when tested at full charge at 140 volts in a 0.01 percent solution of phosphoric acid.

7. A pressed and sintered compact as claimed in claim 1 wherein the agglomerated tantalum ingot-hydride powder is a powder produced by the steps of heating tantalum powder particles under chemically non-reactive conditions to effect adherence and resultant agglomeration between the particles to form an agglomerated mass, and crushing the resultant particulate porous agglomerated mass to form a polynodal granules of adhered particles.

8. A pressed and sintered compact for use as a tantalum anode as claimed in claim 5 wherein the agglomerated tantalum ingot-hydride powder is a powder comprised of polynodal granules of adhered particles produced by the steps of heating tantalum powder particles under chemically non-reactive conditions to effect adherence and agglomeration between the particles, and crushing the resultant particulate porous agglomerated mass to form the polynodal granules of adhered particles.

9. The pressed and sintered compact for use as a tantalum anode as claimed in claim 8 in which the agglomerated tantalum ingot-hydride powder is produced by heating the tantalum powder particles at a temperature of between about 1200° and about 1550°C.

10. A pressed and sintered compact for use as a tantalum anode as claimed in claim 8 in which said particulate porous agglomerated mass is crushed until about 50–95 weight percent of said granules is less than 325 mesh.

11. A pressed and sintered compact for use as a tantalum anode as claimed in claim 8 in which said particulate porous mass is crushed until essentially all said granules are less than 60 mesh.

12. A pressed and sintered compact as claimed in claim 5 wherein the agglomerated tantalum powder produced from sodium reduced tantalum is a powder produced by the steps of heating tantalum powder particles under chemically non-reactive conditions to effect adherence and resultant agglomeration between the particles to form an agglomerated mass, and crushing the resultant particulate porous agglomerated mass to form polynodal granules of adhered particles.

13. A pressed and sintered compact for use as a tantalum anode as claimed in claim 5 wherein the agglomerated tantalum powder produced from sodium reduced tantalum is a powder comprised of polynodal granules of adhered particles produced by the steps of heating tantalum powder particles under chemically non-reactive conditions to effect adherence and agglomeration between the particles, and crushing the resultant particulate porous agglomerated mass to form the polynodal granules of adhered particles.

14. The pressed and sintered compact for use as a tantalum anode as claimed in claim 13 in which the agglomerated tantalum powder produced from sodium reduced tantalum is produced by heating the tantalum powder particles at a temperature of between about 1200° and about 1550°C.

15. A pressed and sintered compact for use as a tantalum anode as claimed in claim 13 in which said particulate porous agglomerated mass is crushed until about 50–95 weight percent of said granules is less than 325 mesh.

16. A pressed and sintered compact for use as a tantalum anode as claimed in claim 13 in which said particulate porous mass is crushed until essentially all said granules are less than 60 mesh.

* * * * *